United States Patent Office 2,993,935
Patented July 25, 1961

2,993,935
ALLYL NITROFORM
Robert H. Saunders, West Chester, Pa., assignor, by mesne assignments, to the United States of America as represented by the Secretary of the Navy
No Drawing. Filed Feb. 28, 1952, Ser. No. 274,072
1 Claim. (Cl. 260—644)

This invention relates to a new explosive compound, allyl nitroform.

The new compound of the invention is a yellow liquid which is stable at room temperature. It has properties making its use as an explosive highly feasible, having an oxygen balance within permissible limits and a sensitivity to impact less than that of TNT.

The new compound may be prepared by the reaction of silver nitroform with allyl bromide in ether, a process similar to that for the preparation of methyl nitroform.

It is an object of the invention to provide a new explosive compound, allyl nitroform.

The invention is illustrated by the following example, but it is not limited thereto:

*Example.*—0.01 mole of allyl bromide was added with stirring to 0.005 mole of silver nitroform in ether. After allowing the mixture to stand for 2 hours the silver bromide was filtered off and the filtrate dried over calcium sulphate. The ether and excess allyl bromide were removed under reduced pressure, leaving a yellow viscous liquid which failed to crystallize upon standing.

The compound has the following formula:

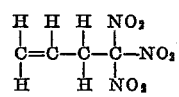

The percentage composition calculated for $C_4H_5N_3O_6$ is, 25.1 percent carbon, 2.6 percent hydrogen, 22.0 percent nitrogen and the remainder oxygen. Analysis of the compound gave, 22.9 percent carbon, 2.5 percent hydrogen and 22.0 percent nitrogen.

The new compound has an oxygen balance of −29. Its impact sensitivity is more than 100 as determined by the Bureau of Mines impact machine, this figure being the distance in centimeters a 2 kilogram weight is required to fall in order to produce 50% shots.

It is thus seen from the above that there has been provided a new compound having properties making its utility as an explosive highly feasible.

What is claimed is:
Allyl nitroform.

No references cited.